(12) United States Patent
Otana et al.

(10) Patent No.: US 8,432,427 B2
(45) Date of Patent: Apr. 30, 2013

(54) OPTICAL SCANNING APPARATUS AND IMAGE FORMING APPARATUS INCLUDING SAME

(75) Inventors: Aiichiro Otana, Osaka (JP); Yoshinobu Yoneima, Osaka (JP)

(73) Assignee: Kyocera Mita Corporation, Osaka (JP)

( * ) Notice: Subject to any disclaimer, the term of this patent is extended or adjusted under 35 U.S.C. 154(b) by 135 days.

(21) Appl. No.: 13/117,353

(22) Filed: May 27, 2011

(65) Prior Publication Data

US 2011/0298882 A1    Dec. 8, 2011

(30) Foreign Application Priority Data

Jun. 4, 2010   (JP) ................. 2010-128557

(51) Int. Cl.
*B41J 27/00*   (2006.01)
*G02B 26/08*   (2006.01)

(52) U.S. Cl.
USPC ................... 347/261; 359/204.1

(58) Field of Classification Search .......... None
See application file for complete search history.

(56) References Cited

U.S. PATENT DOCUMENTS 6,864,906 B2 * 3/2005 Yokoyama .......... 347/119
8,289,600 B2 * 10/2012 Yoshimura .......... 359/204.1

FOREIGN PATENT DOCUMENTS

| JP | 09-033844 | | 2/1997 |
|---|---|---|---|
| JP | 2005-262596 | A | 9/2005 |
| JP | 2006-267398 | A | 10/2006 |
| JP | 2008-112031 | A | 5/2008 |
| JP | 2009-251308 | A | 10/2009 |

OTHER PUBLICATIONS

Machine Translation of JP 2005-262596.
Machine Translation of JP 2006-267398.
English Machine Translation of JP 2008-112031.
English Machine Translation of JPP 2009-251308.

* cited by examiner

*Primary Examiner* — Geoffrey Mruk
*Assistant Examiner* — Bradley Thies (57) ABSTRACT

An optical scanning apparatus includes a housing, light deflector, first optical system and reinforcement member. The housing includes a peripheral wall and a partitioning portion to divide an inner side of the peripheral wall into first and second portion. The partitioning portion includes a first hole to cause the first portion to communicate with the second portion to form an optical path. The light deflector mounted in the first portion has a rotatable polygon mirror to perform deflection scanning of scanning light beams emitted from light sources and a drive unit to drive the rotatable polygon mirror to rotate. The first optical system mounted at least in the first portion causes the scanning light beams reflected from the rotatable polygon mirror to return towards the first hole. The reinforcement member mounted on a surface facing at least the second portion on the partitioning portion reinforces the housing.

12 Claims, 8 Drawing Sheets

OPTICAL SCANNING APPARATUS AND IMAGE FORMING APPARATUS INCLUDING SAME

This application is based on and claims the benefit of priority from Japanese Patent Application No. 2010-128557, filed on 4 Jun. 2010, the content of which is incorporated herein by reference.

BACKGROUND OF THE INVENTION

1. Field of the Invention

The present invention relates to an optical scanning apparatus for irradiating a scanning light beam onto a surface of an image carrier, and to an image forming apparatus including the same.

2. Related Art

An electrophotographic process is used in such a type of image forming apparatus. A polygon mirror is provided inside a housing body. The polygon mirror is configured to perform deflection scanning in a predetermined direction of scanning light beams emitted from a plurality of light sources. The scanning light beams are irradiated onto image carriers that are charged in advance with electrostatic charges, for example, onto surfaces of photosensitive drums. In this manner, electrostatic latent images are respectively formed on the surfaces of respective photosensitive drums. Toner images corresponding to respective colors are transferred and fixed onto a sheet of paper.

In this connection, the polygonal mirror is driven by rotation of a motor shaft. When a vibration occurs as a result of driving of the polygonal mirror, a vibration is induced at a scanning (imaging) position of a scanning light beam. Accordingly, it is likely that a writing position of an image by the scanning light beam becomes unstable (an occurrence of a jitter image). As a result, a technique has been developed to suppress the production of such a jitter image.

SUMMARY OF THE INVENTION

In recent years, the demand for downsizing of an image forming apparatus has increased. A light scanning apparatus tends to occupy a large space within the image forming apparatus. As a result, there has been a constantly increasing demand for a reduction in the height or downsizing of the optical forming apparatus. A housing body having an H-shape in sectional view has been proposed as a structure for responding to the above demand.

More specifically, the housing body having an H-shape in sectional view includes a partitioning plate inside peripheral walls, and for example, divides vertically the inside of the peripheral walls into a first portion and a second portion. The first portion is provided with an optical system such as mirrors and a light deflector composed of a driving unit and a polygon mirror. Another optical system is provided in the second portion.

A slit is formed in the partitioning plate to cause the first portion to communicate with the second portion. A scanning light beam coming from the polygon mirror is reflected by a mirror in the first portion, and is oriented through the slit towards a mirror in the second portion.

It should be noted that the housing body reduces its strength if a slit is formed in the partitioning plate. As a result, when the slit is provided in the partitioning plate, the housing body may be susceptible to the effect of vibration produced by driving of the polygon mirror, resulting in a jitter image.

In this case, it may be considered that a rib made of the same material as the housing body is arranged upright around the polygon mirror to prevent a decrease in the strength of the housing body. However, the housing body having an H-shape in sectional view is in particular susceptible to an effect of heat produced by the driven polygon mirror.

In other words, since an ambient temperature of the first portion that includes the light deflector is higher than the second portion, a temperature difference occurs between the first portion and the second portion. As a result, the housing body tends to deform such that the light deflector in the first portion deforms to project.

More specifically, even if a rib to limit vibration is provided in the first portion of the housing body having an H-shape in sectional view, the rib itself expands and an amount of deformation of the first portion increases, accordingly. Furthermore, the first portion deforms in all directions along the shape of the rib. Accordingly, an angle of inclination of the mirror changes to pose a problem that color misregistration of a color image increases (an occurrence of an image out of color registration). Furthermore, this problem conspicuously increases by a difference between amounts of deformation due to a mismatch in coefficients of linear expansion between the housing body and the drive unit.

Therefore, it is an object of the present invention to provide an optical scanning apparatus that suppresses production of a jitter image or an image out of color registration in a multi-layered housing body that includes a hole such as a slit, and to provide an image forming apparatus that includes such an optical scanning apparatus.

The present invention relates to an optical scanning apparatus, which includes a housing body, a light deflector, a first optical system and a reinforcement member. The housing body includes a peripheral wall and a partitioning portion of a plate shape configured to divide an inner side of the peripheral wall into a first portion and a second portion. The partitioning portion includes a first hole configured to cause the first portion to communicate with the second portion to form an optical path. The light deflector, which is mounted in the first portion, has a rotatable polygon mirror configured to perform deflection scanning of scanning light beams emitted from a plurality of light sources and a drive unit configured to drive the rotatable polygon mirror to rotate through a drive shaft. The first optical system, which is mounted at least in the first portion, is configured to cause the scanning light beams reflected from the rotatable polygon mirror to return towards the first hole. The reinforcement member, which is mounted on a surface that faces at least the second portion on the partitioning portion, is configured to reinforce the housing body.

In an aspect of the present invention, the reinforcement member is mounted near the second portion that is not provided with the light deflector that acts as a heat source, and more specifically, is mounted on a surface of the partitioning portion that faces the second portion of lower temperature. In this manner, it is possible to prevent an adverse effect on the strength of the housing body as a result of formation of the hole. Therefore, it is possible to suppress vibration of the partitioning portion and to prevent warping due to thermal deformation in comparison to a rib simply provided in an upright orientation to prevent vibration. Therefore, it is possible to prevent an adverse effect on image quality resulting from a jitter image or an image out of color registration.

Moreover, since it is possible to prevent a jitter image or an image out of color registration by a configuration only using a reinforcement member, a simple structure is satisfactory and the manufacturing cost of the optical scanning apparatus can be reduced, in comparison to the following examples: An example is that a support position is provided between a hole and another hole in the partitioning portion, and an optical system is provided at the support position to ensure the strength of a housing body. Another example is that a housing is cooled with cooling air from an air blower to reduce the temperature difference.

The present invention provides the optical scanning apparatus that includes the multilayered housing body having the hole and provided with the reinforcement member in the second portion of lower temperature, such that an occurrence of a jitter image or an image out of color registration is prevented. In addition, the present invention provides the image forming apparatus including the optical scanning apparatus.

DETAILED DESCRIPTION OF THE INVENTION

Hereafter, embodiments of the present invention will be described with reference to the figures.

Figure 1:
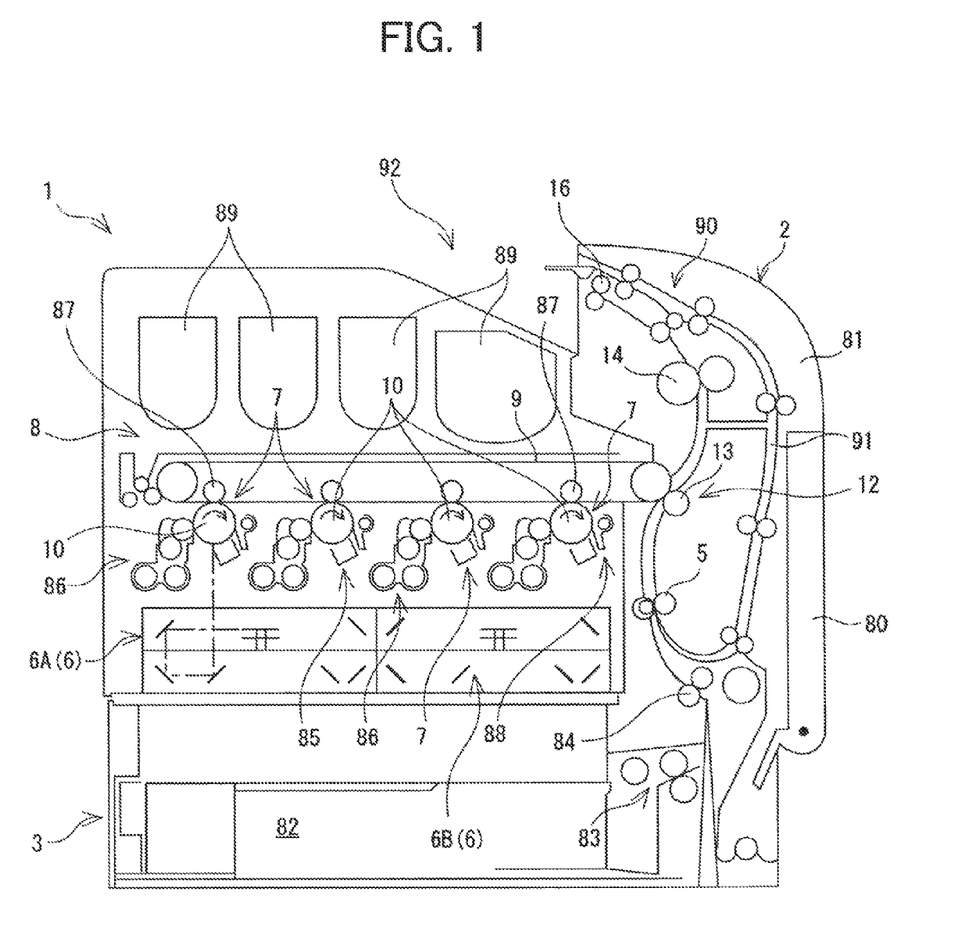
FIG. 1 illustrates the configuration of a printer according to the present embodiment.

FIG. 1 illustrates the configuration of a color printer according to the present embodiment. A sectional view illustrated in FIG. 1 is seen from the left side of a printer 1. As a result, a front surface of the printer 1 is positioned on the right side of FIG. 1, and a back surface of the printer 1 is positioned on the left side of FIG. 1. The printer 1 is provided with an apparatus main body 2. A discharge tray 92 is provided on an upper portion of the apparatus main body 2. A front cover 81 is provided in proximity to the discharge tray 92. A plurality of operation keys enabling various operations by a user and a screen for displaying various types of information are disposed on the front cover 81.

A paper cassette 3 is disposed at a lower portion of the apparatus main body 2. Sheets of paper (recording media) before image formation are stacked in a storage unit 82 of the paper cassette 3. The sheets of paper are separated into individual sheets and fed to inside the apparatus main body 2.

More specifically, a feed roller 83 is provided on the right above the storage unit 82 as shown in FIG. 1. The sheets of paper are fed right and upward with respect to the paper cassette 3. A sheet of paper thus fed is conveyed upwardly inside the apparatus main body 2 along the front surface of the printer 1. The paper cassette 3 is configured to be drawable towards the front surface of the printer 1; that is to say, towards the right side of FIG. 1. When the paper cassette is pulled out, it is possible that the storage unit 82 is replenished with new sheets of paper, or the existing sheets of paper are substituted with another type of sheets of paper.

A conveyance roller 84, registration roller 5, image forming unit 8, and transfer unit 12 are disposed in sequence along a direction of paper conveyance inside the apparatus main body 2. Four drum units 7 are disposed in parallel with each other at the image forming unit 8 according to the present embodiment. Photosensitive drums (image carriers) 10 for supporting visible images (toner images) in respective colors are provided on drum units 7, respectively (refer to FIGS. 1 and 2). Each photosensitive drum 10 is driven in a clockwise direction as shown in FIG. 1 by a driving motor (not illustrated).

An exposure apparatus (light scanning apparatus) 6 is provided below the image forming unit 8, that is to say, between photosensitive drums 10 and the paper cassette 3. The exposure apparatus 6 irradiates four different colors of laser light, for example, yellow, magenta, cyan, and black, towards the photosensitive drums 10, respectively. As illustrated in FIG. 1, a charging device 85, development device 86, intermediate transfer roller 87, and cleaning unit 88 are provided at a suitable position on a periphery of each photosensitive drum 10.

The charging device 85 is positioned at a lower portion of each photosensitive drum 10, and uniformly charges a surface of each photosensitive drum 10. As shown in FIG. 1, the development device 86 is disposed on a left side of each photosensitive drum 10. An intermediate transfer belt 9 is disposed above the photosensitive drums 10. Four toner containers 89 are disposed between the intermediate transfer belt 9 and a discharge tray 92. The toner containers 89 are disposed in a sequence of yellow, magenta, cyan, and black from the back surface to the front surface of the printer 1. A toner container for black is configured to have the largest capacity.

The yellow, magenta, cyan, and black toner are electrostatically attached to respective surfaces of photosensitive drums 10. In this manner, toner images corresponding to electrostatic latent images created by the exposure device 6 are developed on the respective surfaces of photosensitive drums 10.

The toner images formed on the surfaces of the photosensitive drums 10 are transferred in sequence to the intermediate transfer belt 9 and superimposed as a toner image corresponding to one page. A transfer roller 13 is provided at the transfer unit 12. The transfer roller 13 is configured to be in press contact with the transfer belt 9 obliquely from below. When a sheet of paper passes between the transfer belt 9 and the transfer roller 13, the toner image that is superimposed on the transfer belt 9 is transferred onto the sheet of paper.

A fixing unit 14, discharge branching portion 90 and discharge roller 16 are disposed in sequence downstream of the transfer unit 12 with reference to the direction of paper conveyance. The sheet of paper fed from the fixing unit 14 is discharged to the discharge tray 92.

In the present embodiment, a conveyance path 91 for duplex printing is provided between the transfer unit 12 and a manual feed tray 80. The conveyance path 91 branches from the discharge branching portion 90 on a front side of the apparatus main body 2, extending downwardly to be connected with an upstream side of the registration roller 5.

Figure 3:
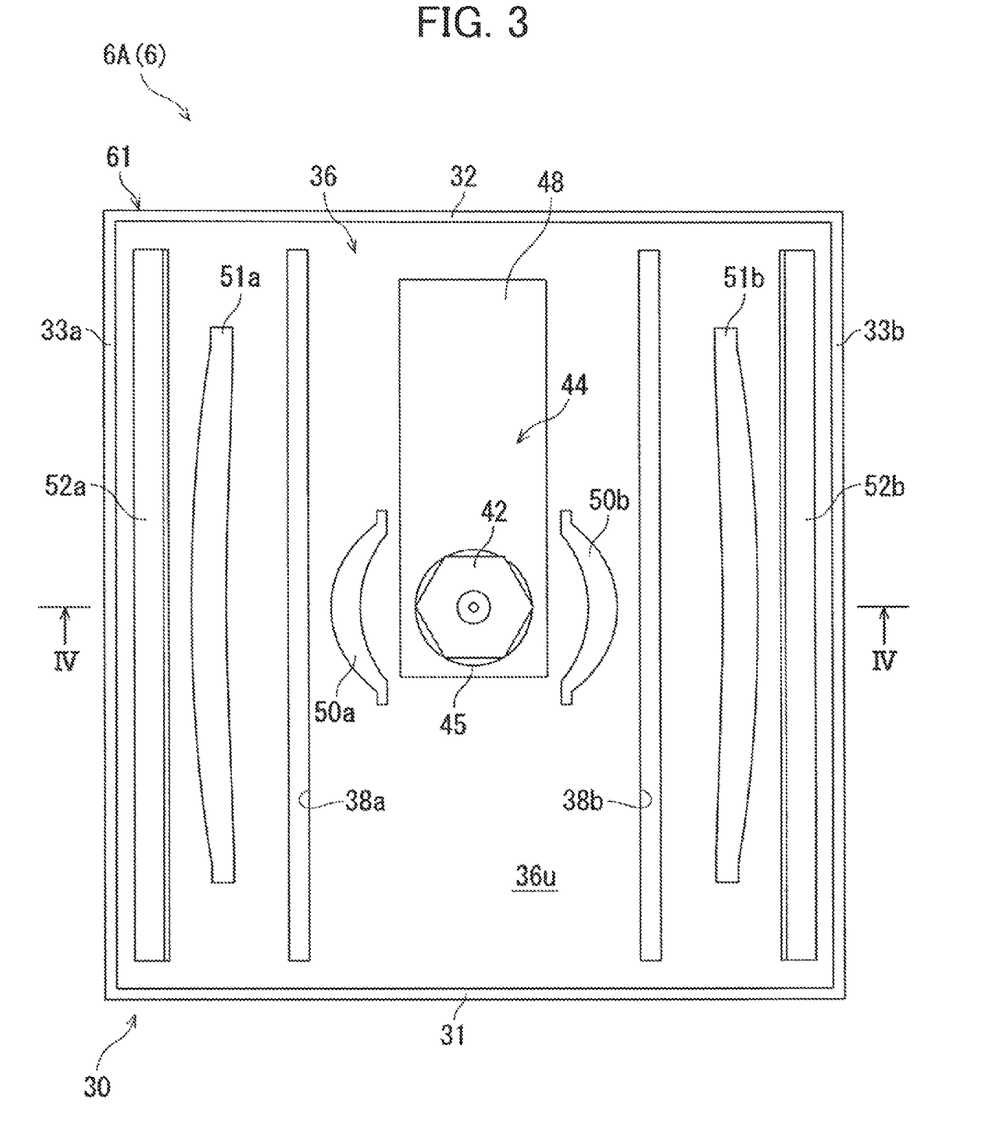
FIG. 3 is a plan view of an exposure device illustrated in FIG. 1.
Figure 4:
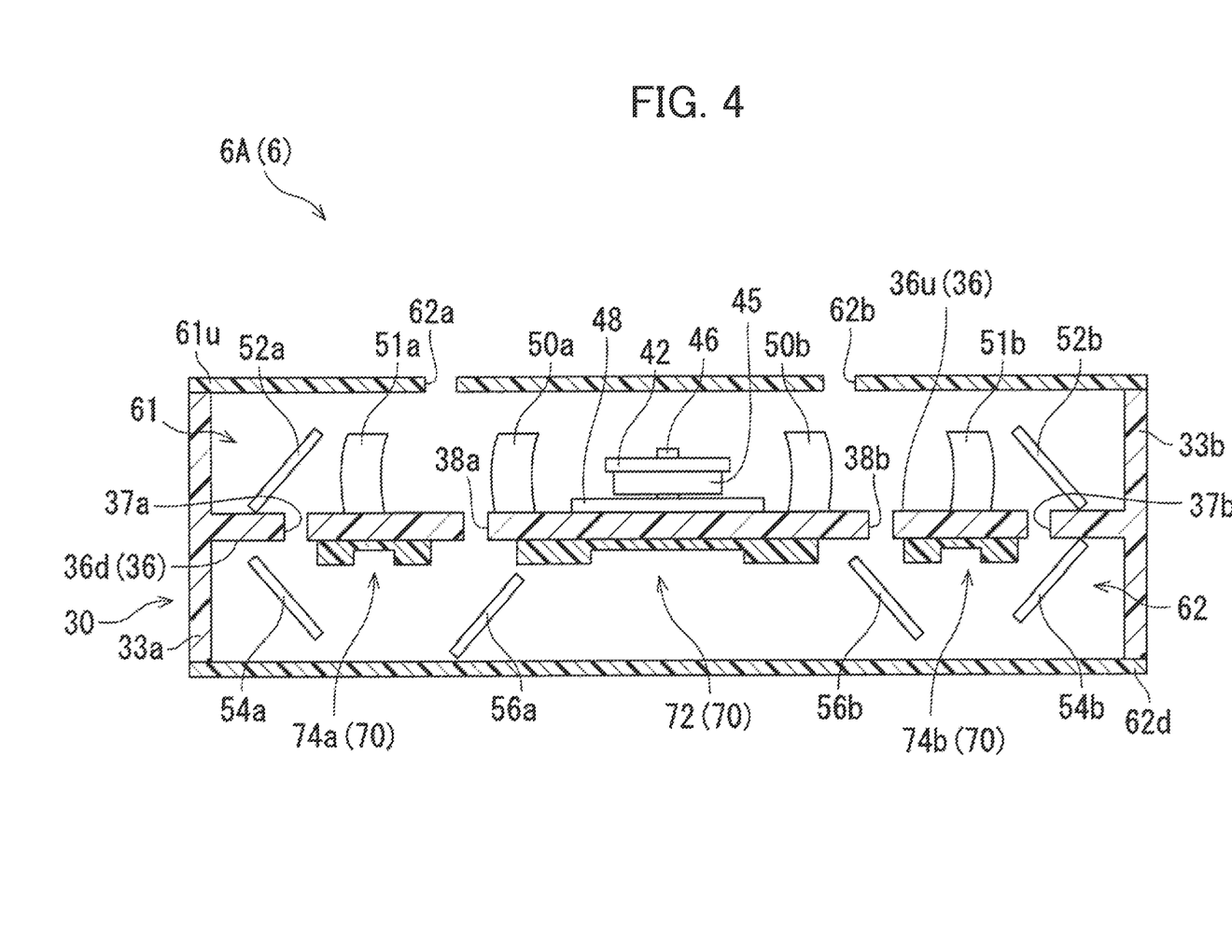
FIG. 4 is a sectional view along the line TV-IV in FIG. 3.
Figure 5:
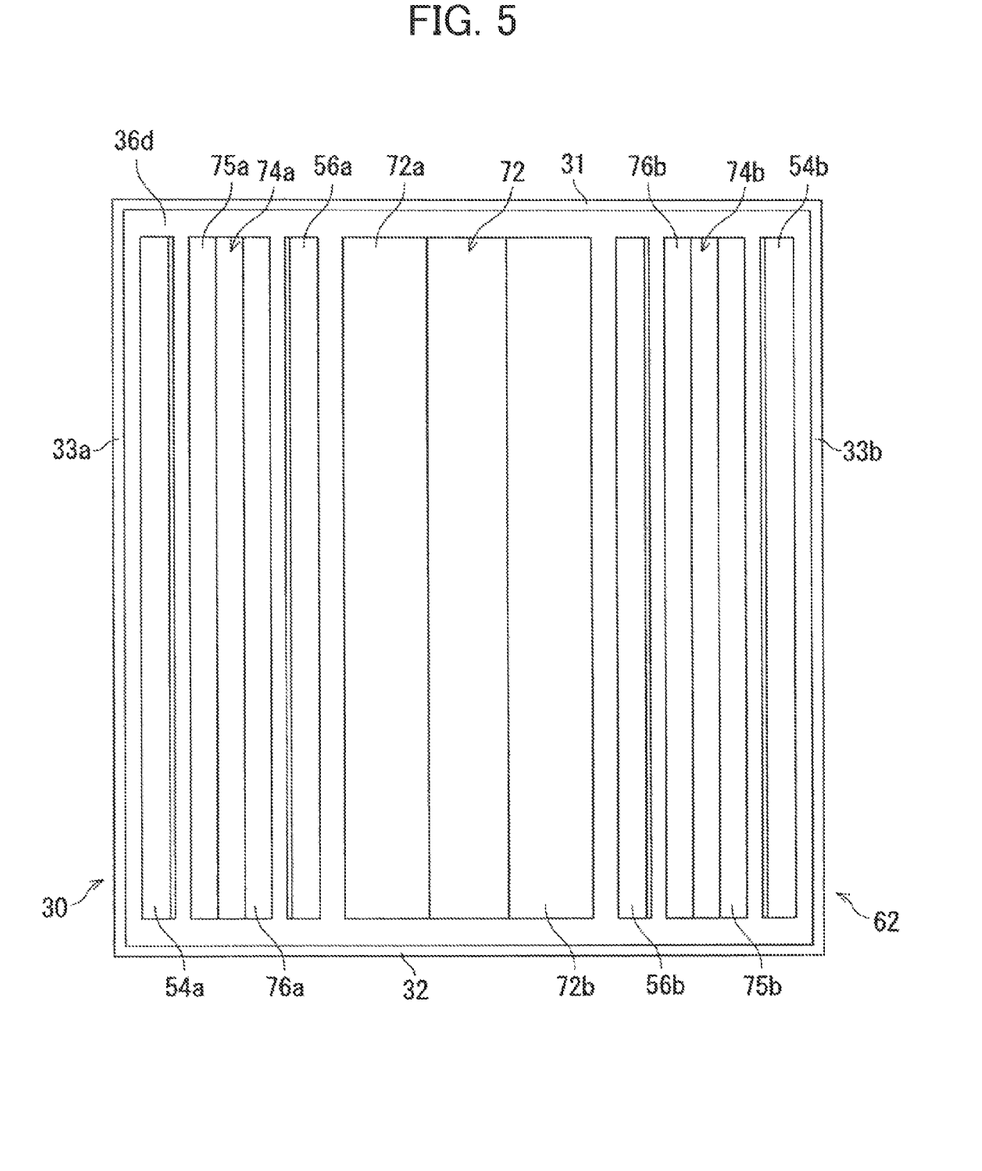
FIG. 5 is a back view of the exposure device illustrated in FIG. 1.

Various types of optical devices are assembled into the exposure apparatus 6 in the present embodiment. More specifically, as illustrated in FIGS. 3 to 5, the exposure apparatus 6 includes a box-shaped housing (housing body) 30 formed of plastic. The housing (housing body) 30 includes a partitioning plate (partitioning portion of a plate shape) that has a substantially quadrilateral shape when viewed in plan. Respective sides of the partitioning plate 36 are enclosed by four peripheral walls including a front surface 31, back surface 32 and side surfaces 33a, 33b.

The front surface 31 and the back surface 32 are opposed to each other in a primary scanning direction (direction of a rotational axis of the photosensitive drums 10). The side surfaces 33a, 33b are opposed to each other in a secondary scanning direction (direction of paper conveyance).

As illustrated in FIG. 4, the housing 30 includes a cover 61u that includes a slit 62a and a slit 62b at a predetermined position, and a cover 62d. One end of the front surface 31, the back surface 32, and the side surfaces 33a, 33b respectively abut with the cover 61u. The other end of the front surface 31, the back surface 32, and the side surfaces 33a, 33b respectively abut with the cover 62d. FIGS. 3 and 5 omit illustration of the above surfaces to facilitate description of the structure inside the housing 30.

The exposure apparatus 6 according to the present embodiment is secured to the apparatus main body 2 with screws (not illustrated), in such a configuration that the cover 61u is oriented towards the photosensitive drum 10 and the cover 62d is oriented towards the paper cassette 3. The partitioning plate 36 is provided where it partitions the inside of the housing 30, for example, into upper and lower portions.

More specifically, the partitioning plate 36 according to the present embodiment is connected to a substantially central position with respect to the front surface 31, the back surface 32 and the side surfaces 33a, 33b, when seen from a height direction (an H-shaped structure in the sectional view of FIG. 4). The partitioning plate 36 extends substantially parallel to the covers 61u, 62d.

The partitioning plate 36 partitions the inside of the housing 30 into a first portion 61 and a second portion 62. As illustrated in FIG. 4, the partitioning plate 36 includes a reference surface of higher temperature 36u and a reference surface of lower temperature 36d (surface facing the second portion).

More specifically, the first portion 61 is a space enclosed by the cover 61u, the front surface 31, the back surface 32, the side surfaces 33a, 33b and the reference surface of higher temperature 36u. On the other hand, the second portion 62 is a space enclosed by the reference surface of lower temperature 36d, the front surface 31, the back surface 32, the side surfaces 33a, 33b and the cover 62d.

The housing 30 according to the present embodiment includes an optical device composed of two light sources 40 (refer to FIG. 2) in addition to a light deflector, an optical system, or the like.

In other words, an exposure apparatus 6A corresponding to yellow and magenta images, for example, illustrated on the left side of FIG. 1 and an exposure apparatus 6B corresponding to cyan and black images, for example, illustrated on the right side of FIG. 1 are separately mounted on the printer 1.

In the description below, the former exposure apparatus 6A corresponding to the yellow and magenta images will be used as an example.

The two light sources 40 of the exposure apparatus 6A are disposed in parallel at the front surface 31 outside the housing 30. The two light sources 40 include a yellow laser diode (LD) and a magenta LD. A light beam in a visible region from each independent LD is respectively irradiated towards the light deflector inside the housing 30.

The light deflector is disposed in the first portion 61 and includes a polygon mirror (rotatable polygon mirror) 42 and a driving unit 44 (refer to FIG. 3). The polygon mirror 42 has a planar shape of a regular polygon. Each side surface of the polygon mirror 42 is formed as a planar mirror. A central portion of the polygon mirror 42 is fixed to a motor shaft 46 (refer to FIG. 4).

The drive unit 44 includes a driving motor 45 that is connected to the motor shaft 46. The motor 45 is mounted on a rectangular circuit board 48 together with electrical components (not shown) such as integrated circuits, electrical resistors, or the like. The circuit board 48 is disposed under the polygon mirror 42, extending towards the back surface 32 and is fixed to the reference surface of higher temperature 36u.

The optical system described above is provided in a region in which laser light reflected by the polygon mirror 42 travels. The above optical system includes fθ lenses 50a, 50b and fθ lenses 51a, 51b for yellow and magenta, and six planar folding mirrors 52a, 52b, 54a, 54b, 56a, and 56b.

The yellow and magenta fθ lenses 50a, 50b are provided in the first portion 61, and are respectively disposed along the secondary scanning direction to be opposite to each other with respect to the polygon mirror 42. For example, the yellow fθ lens 50a is provided on a left side of the polygon mirror 42 as illustrated in FIGS. 3 and 4. The magenta fθ lens 50b is provided on a right side of the polygon mirror 42.

Next, the yellow fθ lens 51a is provided in parallel on a left side of the yellow fθ lens 50a as illustrated in FIGS. 3 and 4. The magenta fθ lens 51b is provided in parallel on a right side of the fθ lens 50b. The fθ lenses 51a, 51b are also provided in the first portion 61.

The yellow folding mirrors 52a, 54a, 56a are provided on the left with respect to the polygon mirror 42 as illustrated in FIG. 4.

Firstly, the folding mirror 52a is disposed in proximity to an intersection of the side surface 33a and the reference surface of higher temperature 36u in the first portion 61. Both ends of the folding mirror 52a are supported by a plastic mirror support member (not illustrated) formed on the reference surface 36u, and are disposed inclined at a predetermined angle along a primary scanning direction.

In contrast, the folding mirrors 54a, 56a are provided in the second portion 62.

More particularly, the folding mirror 54a is disposed below opposite to the folding mirror 52a with respect to the partitioning plate 36. The folding mirror 56a is disposed below the yellow fθ lens 50a. Both ends of each of the folding mirrors 54a, 56a are supported by a plastic mirror supporting member (not illustrated) formed on the reference surface of lower temperature 36d and are disposed inclined at a predetermined angle along the primary scanning direction.

In the present embodiment as described above, the polygon mirror 42, the fθ lens 50a, 51a, and the folding mirror 52a are provided in the first portion 61. The folding mirrors 54a, 56a are provided in the second portion 62. Moreover, the exposure apparatus 6A is disposed under each photosensitive drum 10. For that reason, a slit (hole) 37a and a slit (another hole) 38a are formed in the partitioning plate 36.

More specifically, as illustrated in FIG. 4, the slit 37a penetrates the reference surface of lower temperature 36d and the reference surface of higher temperature 36u at a position at which a scanning light beam from the folding mirror 52a is guided to the folding mirror 54a. The slit 38a penetrates the reference surface of lower temperature 36d and the reference surface of higher temperature 36u at a position at which a scanning light beam from the folding mirror 56a is guided to the photosensitive drum 10.

As illustrated in FIG. 4, the slit 38a is formed between the fθ lens 50a and the fθ lens 51a on a left side of the polygon mirror 42 in the partitioning plate 36 according to the present embodiment. The two slits 37a, 38a for yellow respectively extend along the primary scanning direction similarly with the disposition direction of the folding mirrors 52a, 54a, and 56a.

The folding mirrors 52b, 54b, and 56b for magenta are disposed on a right side of the polygon mirror 42 in FIGS. 3 and 4, and are provided similarly with the folding mirrors 52a, 54a, and 56a for yellow. Furthermore, the partitioning plate 36 includes two slits for magenta, a slit (hole) 37b and a slit (another hole) 38b that are disposed geometrically similar to the slits 37a, 38a for yellow.

Figure 2:
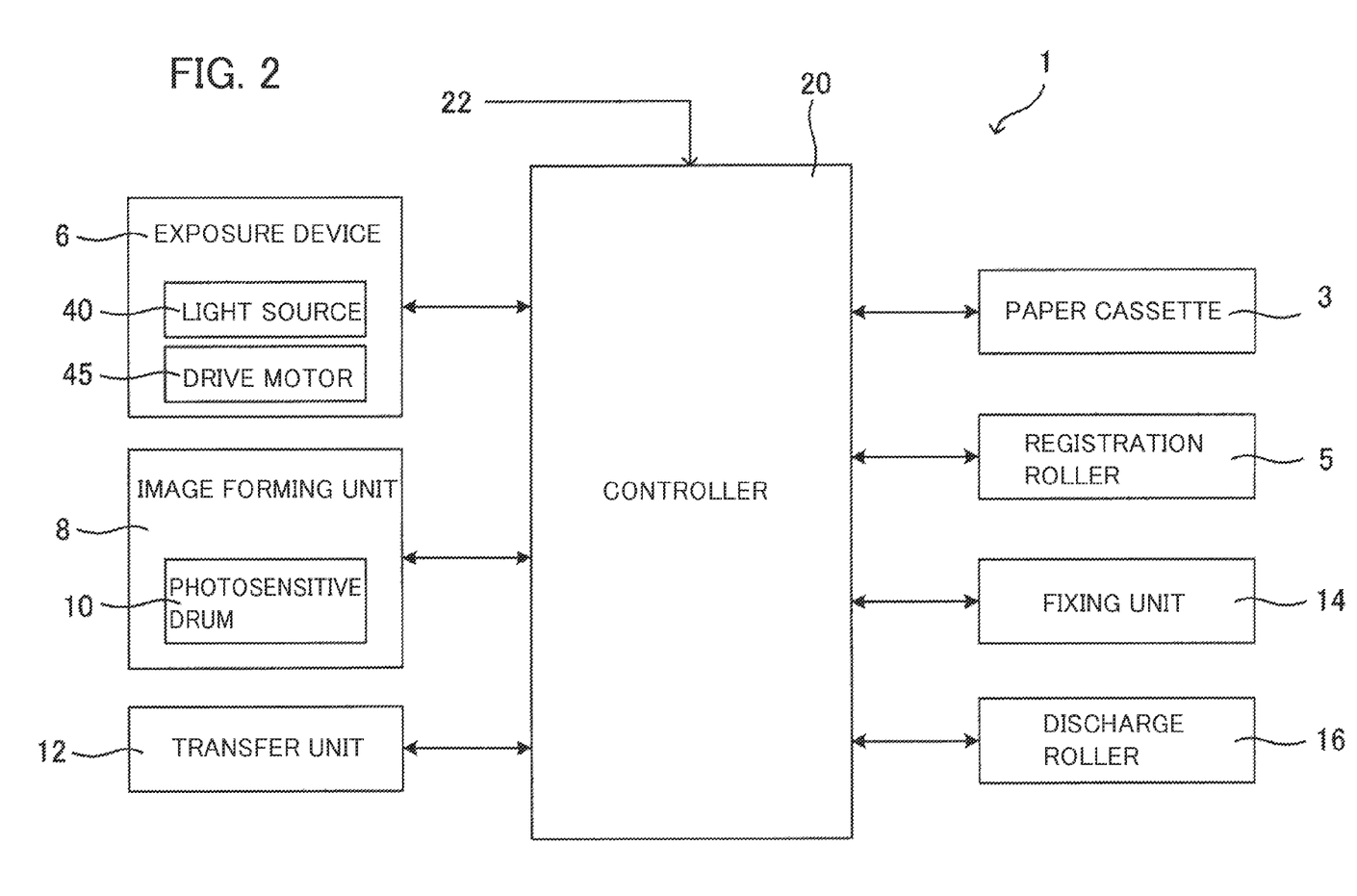
FIG. 2 illustrates the configuration of the printer according to FIG. 1 that includes a controller.

When each light source 40 for yellow or magenta irradiates a laser light beam in response to a signal from a controller 20 provided in the apparatus main body 2 as illustrated in FIG. 2, the laser light beam travels towards the polygon mirror 42 through corresponding collimator lens, prism and cylindrical lens.

Similarly, when the motor shaft 46 rotates at a high speed with a drive force applied by the driving motor 45 in response to a signal from the controller 20, the polygon mirror 42 rotates at a high speed.

Respective yellow and magenta laser light beams enter the polygon mirror 42 with a minute angle of deviation. The rotatable polygon mirror 42 deflects a laser light beam and delivers the deflected laser light beam towards the side surface 33a (33b).

The laser light beam reflected by the polygon mirror 42 is deflected at an equal speed by the corresponding fθ lenses 50a (50b) and 51a (51b).

The laser light beam that has passed through the fθ lenses 50a (50b) and 51a (51b) is reflected downwards by the folding mirror 52a (52b), and passes through the slit 37a (37b) in the partitioning plate 36 to reach the second portion 62.

Then, the laser light beam is reflected by the folding mirror 54a (54b) towards inside the housing 30. Thereafter, the laser light beam is reflected again upwardly by the folding mirror 56a (56b). The laser light beam passes through the slit 38a (38b) of the partitioning plate 36 and the slit 62a (62b) of the cover 61u, and reaches a surface of the photosensitive drum 10 for yellow (the photosensitive drum 10 for magenta).

Similarly, in the exposure apparatus 6B corresponding to cyan and black images, a laser light beam of each light source 40 passes through the polygon mirror 42, and corresponding fθ lenses 50a (50b) and 51a (51b), and the folding mirrors 52a (52b), 54a (54b) and 56a (56b) to reach a surface of the photosensitive drum 10 for cyan (the photosensitive drum 10 for black), in accordance with a signal from the controller 20.

A rib (reinforcement member) 70 is provided in the respective second portions 62 of the exposure devices 6A, 6B according to the present embodiment.

More specifically, as illustrated in FIGS. 4 and 5, the rib 70 according to the present embodiment includes an inner rib 72 and outer ribs 74a, 74b, and is attached to the reference surface of lower temperature 36d of the partitioning plate 36.

More specifically, the inner rib 72 and the outer ribs 74a, 74b are configured substantially in the shape of the letter U when viewed in cross section. The inner rib 72 is provided on the reference surface 36d, at a position that straddles the circuit board 48 in the secondary scanning direction (refer to FIGS. 4 and 5).

The outer rib 74a is disposed at a position that straddles the fθ lens 51a in the secondary scanning direction; that is to say, between the slit 37a and the slit 38a (refer to FIG. 4). The outer rib 74b is disposed at a position that straddles the fθ lens 51b in the secondary scanning direction; that is to say, between the slit 37b and the slit 38b (refer to FIG. 4).

The inner rib 72, and the outer ribs 74a, 74b are integrally formed on the reference surface 36d using a plastic formed from the same material as the partitioning plate 36. The inner rib 72 and the outer ribs 74a, 74b respectively extend along the primary scanning direction similarly with the direction of disposition of the two slits 37a, 38a for yellow, and the folding mirrors 52a, 54a, and 56a.

Returning now to FIG. 1, when the printer 1 including the exposure apparatus 6A, 6B above executes a printing operation, sheets of paper are separated into individual sheets and conveyed from the paper cassette 3 by the feed roller 83, and reach the registration roller 5. The registration roller 5 corrects an inclined feed orientation of a sheet of paper, and feeds the sheet of paper towards the transfer unit 12 while adjusting timing of transferring a toner image formed by the image forming unit 8.

An input port 22 illustrated in FIG. 2 is configured to receive from an external unit an image data based on which a printing operation is performed. The image data include various types of images such as characters and reference numerals, figures, symbols, line diagrams, patterns, and the like, in data format. The controller 20 uses the data to control the irradiation of a laser light beam and the like.

More specifically, the charging device 85 charges the surface of each photosensitive drum 10, and the exposure apparatus 6 irradiates a laser light beam onto the surface of each photosensitive drum 10. In this manner, an electrostatic latent image is formed on the surface of each photosensitive drum 10, and a toner image in each color is formed using the electrostatic latent image.

Each toner image is transferred onto the sheet of paper through the transfer belt 9 in the transfer unit 12. Toner remaining on the surface of each photosensitive drum 10 is removed by the cleaning unit 88.

Thereafter, the sheet of paper is fed to the fixing unit 14 with an unfixed toner image thereon. The sheet of paper undergoes heating and pressuring in the fixing unit 14 such that the toner image is fixed. Next, the sheet of paper that has been fed from the fixing unit 14 is discharged to the discharge tray 92 by the discharge roller 16.

When duplex printing is executed instead of simplex printing, a direction of conveying the sheet of paper that is discharged from the fixing unit 14 is switched at the discharge branching portion 90. That is to say, the sheet of paper that is printed on one side is drawn into the apparatus main body 2, and conveyed to the conveyance path 91 for duplex printing. Next, the sheet of paper is fed upstream of the registration roller 5, and is fed again to the transfer unit 12. In this manner, a toner image is transferred onto a surface of the sheet of paper on which printing has not yet been performed.

The inner rib 72 and outer ribs 74a, 74b according to the present embodiment that are substantially in the shape of the letter U in sectional view are made of a plastic similar to the partitioning plate 36. With respect to the outer rib 74a (74b), a width of a portion 75a (75b) closer to the side wall 33a (33b) is substantially equal to a width of a portion 76a (76b) closer to the center of the housing 30 (refer to FIGS. 4 and 5). The outer rib 74a (74b) may be configured such that it is less susceptible to deformation as it approaches more the drive unit 44 that is a heat source.

Figure 6:
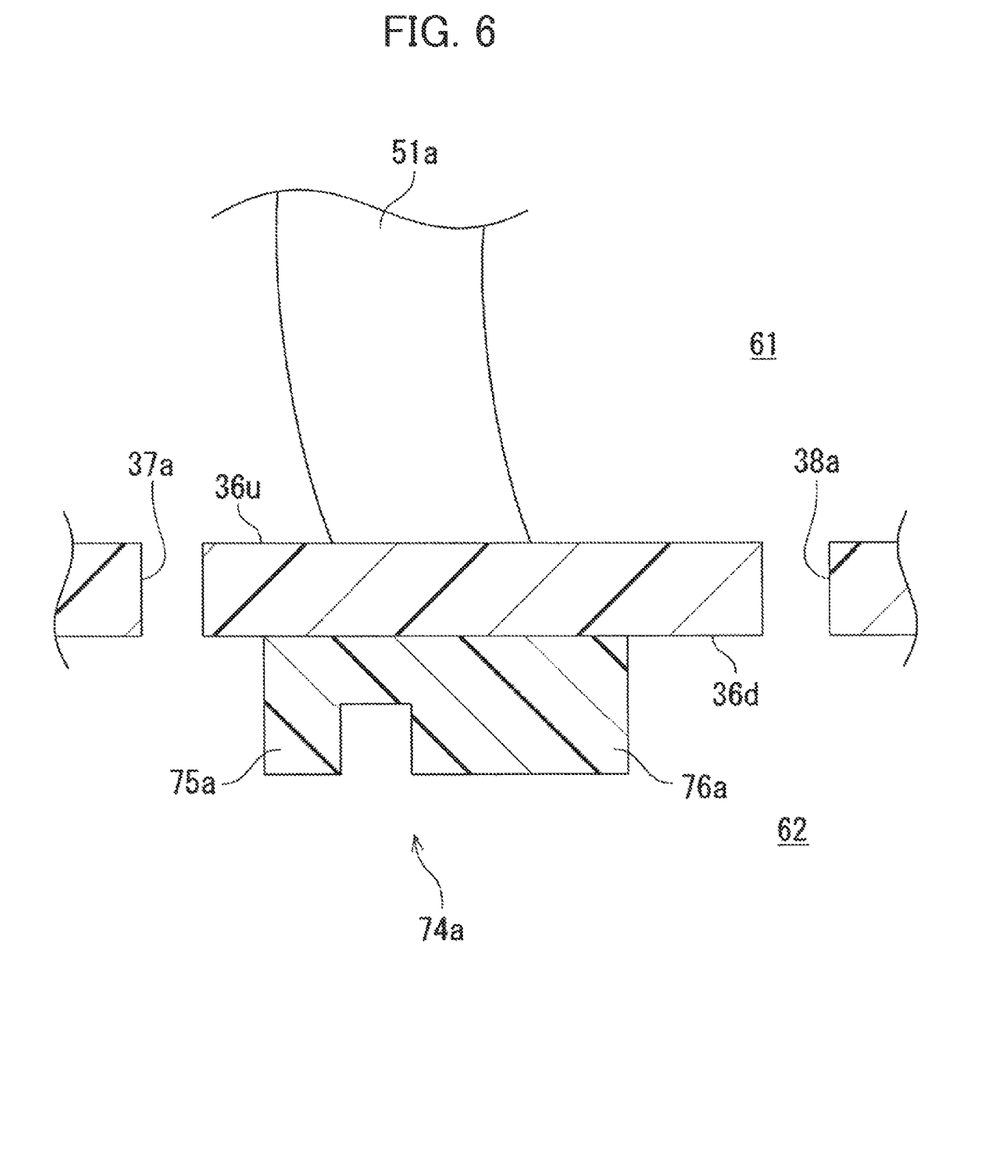
FIG. 6 is a schematic diagram illustrating an exposure device according to a second embodiment.

More specifically, for example, FIG. 6 illustrates an enlarged view of a periphery of the outer rib 74a. In relation to the outer rib 74a, the width of the portion 76a closer to the center of the housing 30 is configured to be greater than the width of the portion 75a closer to the side wall 33a.

On the other hand, in each of the present embodiments, the inner rib 72 and the outer ribs 74a, 74b are integrated with the partitioning plate 36.

With respect to the outer rib 74a (74b), the portion 76a (76b) closer to the center of the housing 30 may alternatively be made of a material that has a higher stiffness than the portion 75a (75b) closer to the side wall 33a (33b). This configuration also allows the outer rib 74a (74b) to be less susceptible to deformation as it approaches more the drive unit 44.

Furthermore, the rib 70 may alternatively be configured to be separate from the partitioning plate 36, and made of a different material that has a higher stiffness than the partitioning plate 36.

Figure 7:
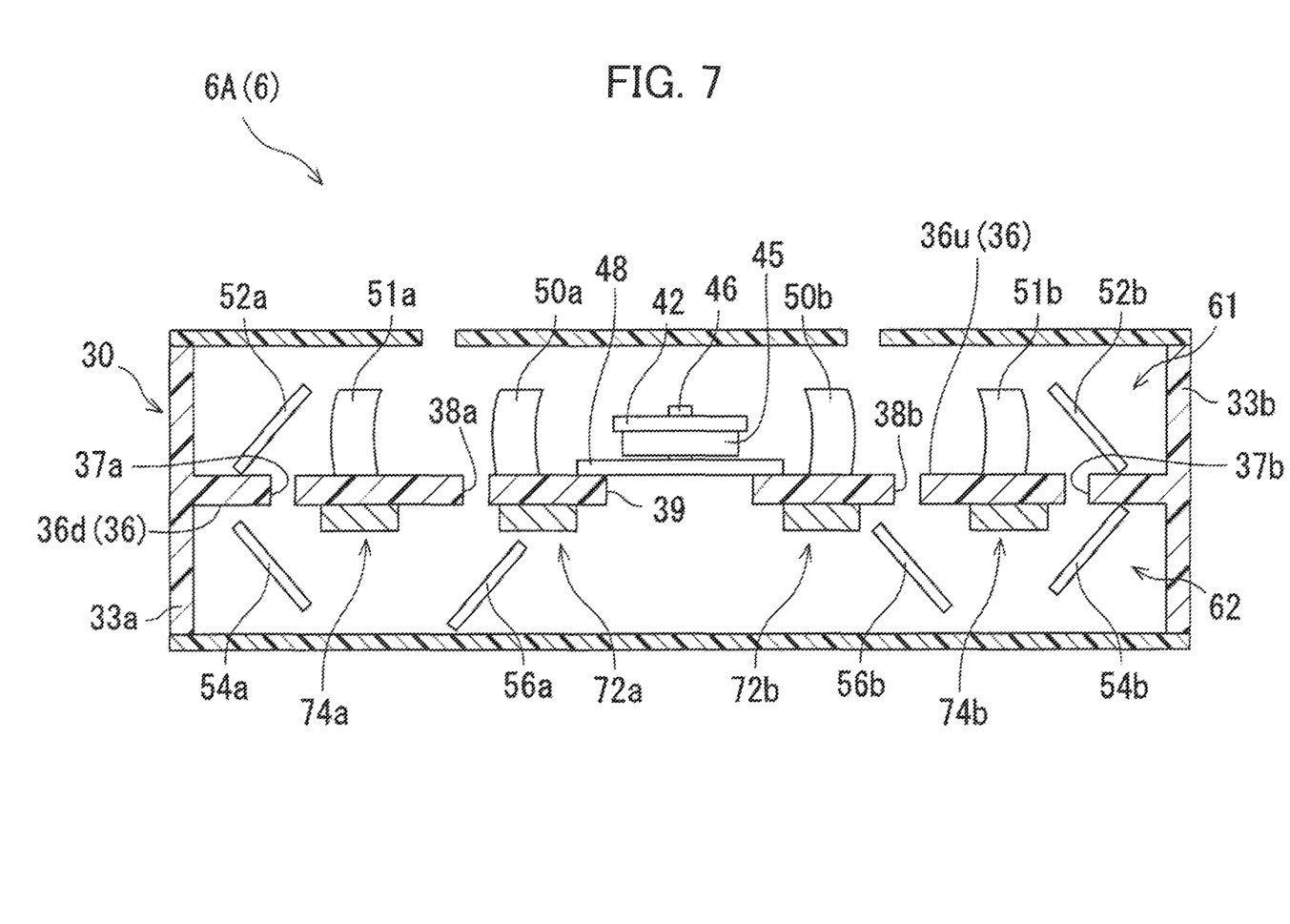
FIG. 7 is a sectional view of an exposure device according to a third embodiment.
Figure 8:
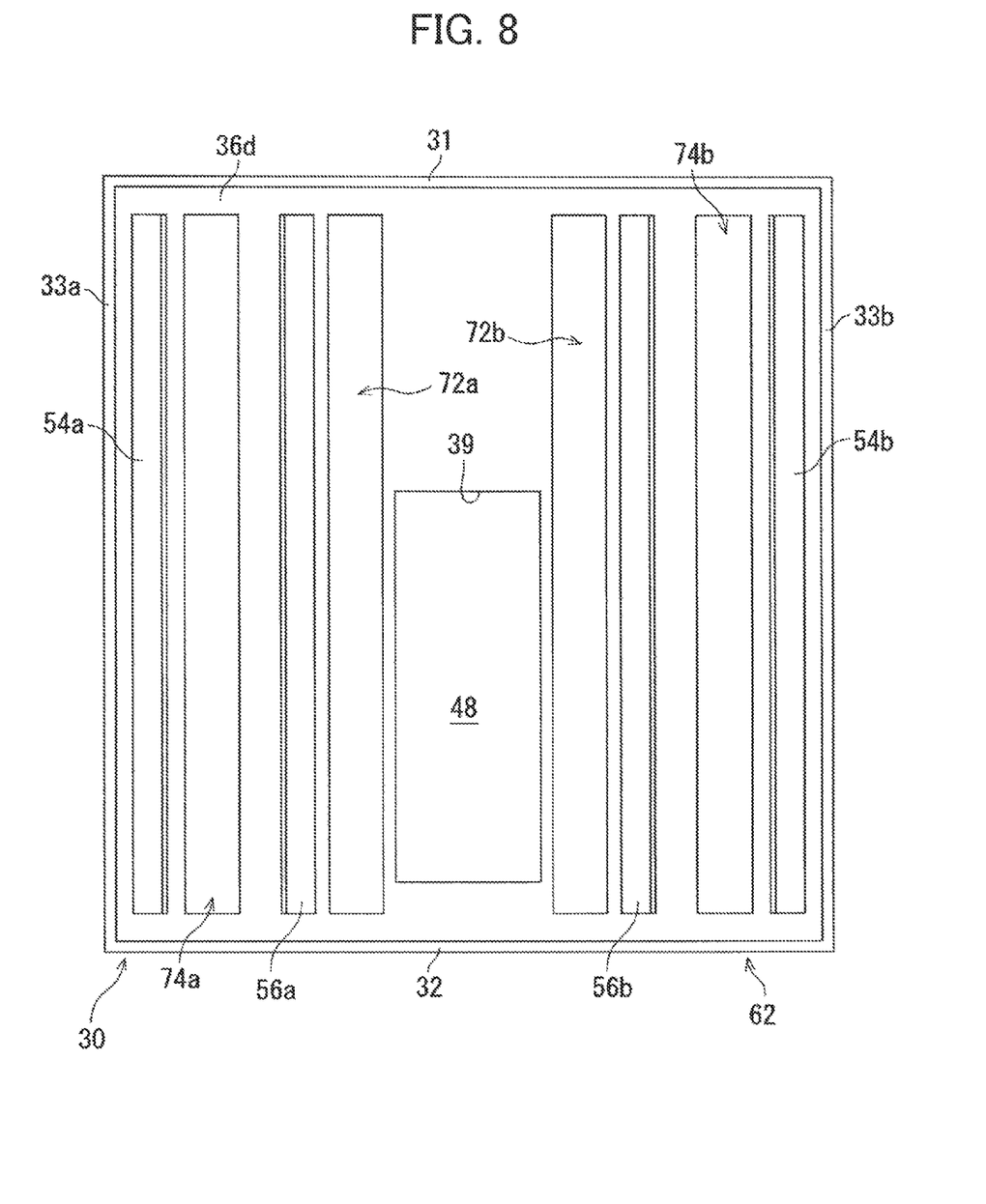
FIG. 8 is a back view of the exposure device illustrated in FIG. 7.

More specifically, in an example illustrated in FIGS. 7 and 8, an opening 39 is formed in a partitioning plate 36, extending from the proximity of the center of the partitioning plate 36 towards the back surface 32. Except for the differences described above, the example illustrated in FIGS. 7 and 8 is similar to the above embodiments. Accordingly, the same reference numerals are used for components of the example illustrated in FIGS. 7 and 8, which have functions similar to those of the above embodiments. Descriptions about such components will not be repeated. A rib 70 in the example illustrated in FIGS. 7 and 8 includes inner ribs 72a, 72b and outer ribs 74a, 74b, and is attached to a reference surface of lower temperature 36d.

The inner ribs 72a, 72b and the outer ribs 74a, 74b are formed from a plate having a higher stiffness than the material used in the partitioning plate 36, for example, a metal plate or a glass plate. An inner rib 72a (72b) is provided on the reference surface 36d opposite to the fθ lens 50a (50b); at a position that straddles the circuit board 48 in the secondary scanning direction.

An outer rib 74a is disposed between the slit 37a and the slit 38a. An outer rib 74b is provided between the slit 37b and the slit 38b, extending along the primary scanning direction similarly with the disposition direction of the inner rib 72 and the outer ribs 74a, 74b in the embodiment described above (refer to FIG. 8).

As described above, according to each of the above embodiments, since the housing 30 is configured with an H-shaped structure when viewed in cross section, it is possible to achieve a reduction in the height and downsizing of the exposure apparatus 6.

The inside of the housing 30 is partitioned into the first portion 61 and the second portion 62 by the partitioning plate 36. The polygon mirror 42 and the drive unit 44 are provided in the first portion 61. A scanning light beam from the polygon mirror 42 is reflected by the folding mirror 52a (52b) through the slit 37a (37b) formed in the partitioning plate 36 of the first portion 61, and is oriented towards the second portion 62.

When the partitioning plate 36 of the housing 30 includes the slits 37a, 37b, the strength of the housing 30 reduces in comparison to a configuration in which the partitioning plate 36 does not include the slits 37a, 37b.

Furthermore, as illustrated in the present embodiment, the slits 38a, 38b are required of the partitioning plate 36 to enable the scanning light beam from the polygon mirror 42 to pass from the first portion 61 through the second portion 62 to reach the first portion 61 again. Consequently, the strength of the housing 30 further reduces.

When the polygon mirror 42 is driven by the rotation of the motor shaft 46, a vibration is produced due to the rotation of the motor shaft 46. This vibration is easily transmitted from the partitioning plate 36 provided with the slits 37a, 37b, 38a, 38b to the mirror support member. As a result, there is a risk that a writing position of an image started by the scanning light beam will not be stable (occurrence of a jitter image).

Furthermore, heat is also produced by the rotation of the motor shaft 46. This heat increases an ambient temperature of the first portion 61. Accordingly, it applies an expansion force to the fθ lenses 50a, 50b, 51a, 51b and the folding mirrors 52a, 52b of the first portion 61. Since the drive unit 44 that acts as a heat source is not provided in the second portion 62, an ambient temperature of the second portion 62 will be lower than the first portion 61. As a result, an expansion force as much as that of the first portion 61 does not act on the folding mirrors 54a, 54b, 56a, and 56b of the second portion 62.

That is to say, a temperature difference is present between the first portion 61 and the second portion 62. The expansion produced in the reference surface of higher temperature 36u of the partitioning plate 36 is restricted by the reference surface of lower temperature 36d. As a result, a tensional force acts on the first portion 61 of higher temperature and a compression force acts on the second portion 62 of lower temperature. The polygon mirror 42 of the first portion 61 rises upwardly in the housing 30. A central portion of the partitioning plate 36 in an orientation illustrated in FIG. 4, for example, is deformed to project upwardly. Accordingly, inclination angles of the folding mirrors 52a, 52b will change. Consequently, it is concerned that the color misregistration of a color image will increase (occurrence of an image out of color registration).

In particular, in the partitioning plate 36 that includes the slits 37a, 37b, 38a, 38b, the slits 37a, 37b, 38a, 38b extend in the primary scanning direction similarly with the folding mirrors 52a, 52b. Therefore, the partitioning plate 36 tends to warp in a direction that is substantially orthogonal to the primary scanning direction (that is to say, the secondary scanning direction). Accordingly, the color misregistration of a color image in the secondary scanning direction will further increase.

However, in the present embodiment, the rib 70 is attached to the second portion 62 in which the circuit board 48 and the driving motor 45 of heat sources are not disposed (more specifically, the reference surface of lower temperature 36d of the partitioning plate 36). In this manner, a reduction in the strength of the housing 30 resulting from the formation of the slits 37a, 37b, 38a, 38b is prevented. In comparison to a case in which a rib simply provided in an upright configuration for the purpose of suppressing vibration, it is possible to realize a compact exposure apparatus 6, in addition to not only suppressing vibration of the partitioning plate 36, but also avoiding warping of the partitioning plate 36 due to thermal deformation. Therefore, it is possible to prevent deterioration in image quality due to a jitter image or color misregistration of the color image.

In addition, the prevention of a jitter image or color misregistration of the color image is implemented by the rib 70. Consequently, it is possible to allow the exposure apparatus 6 to be simply configured and suppress the manufacturing cost in comparison to the following cases: A support position is provided between the slit 37a and the slit 38a of the partitioning plate 36, and folding mirrors are provided at this support position to maintain the strength of the housing. Alternatively, an air blower is provided to supply a cooling air to reduce the temperature difference.

The rib 70 is provided between the slit 37a and the slit 38a or at a position straddling the drive unit 44, respectively. As a result, even when the strength of the housing 30 reduces further, it is possible to prevent warping of the polygon mirror 42 of the first portion 61 into a projection.

As illustrated in the example in FIG. 4, when the rib 70 is formed of the same material as the housing 30 to be integral with the housing 30, it is possible to eliminate the trouble associated with providing the rib 70 as a separate component on the reference surface of lower temperature 36d.

With the example illustrated in FIG. 7, when the rib 70 is configured separate from the housing 30 using a material having a higher stiffness than the housing 30, the transmission of the vibration of the motor shaft 46 to the partitioning plate 36 is suppressed on the whole. In addition, it is possible to suppress the resonance due to the natural frequency of the housing 30 being close to the rotation frequency of the motor shaft 46.

As illustrated in the example in FIG. 6, a locational temperature difference between the first portion 61 and the second portion 62 increases as a location approaches more to the heat source. However, since the outer rib 74a is configured to be more resistant to deformation as it approaches more the heat source, it is possible to prevent more efficiently warping of the polygon mirror 42 of the first portion 61 into a projecting configuration.

Furthermore, since deterioration of image quality due to a jitter image or color misregistration of the color image is prevented, and superior image quality is obtained, the reliability of the printer 1 is increased.

The present invention is not limited to the above embodiments, and various modifications thereof may be performed within a scope that does not depart from the scope of the appended claims.

For example, two light sources 40 are provided in the exposure apparatus 6 according to the above embodiments. However there is no particular limitation to the above embodiments. Four light sources 40 may be provided in one exposure apparatus 6.

The partitioning plate 36 according to the above embodiments partitions the housing 30 into an upper and a lower portion. However, partitioning of the housing 30 in various directions such as left and right directions is possible according to the orientation of the exposure apparatus 6.

In the above embodiments, the folding mirrors 54a, 54b, 56a, and 56b that act as optical systems are also provided in the second portion 62. However, it may be alternatively possible that an optical system is not arranged in the second portion 62.

This is due to the fact that when the photosensitive drum 10 is disposed below the exposure apparatus 6, the scanning light beam from the first portion 61 passes through the slits 37a, 37b and reaches the second portion 62, and then arrives at the photosensitive drum without further modification.

The present invention is not limited to a configuration in which the reinforcement member is disposed only in the second portion 62. In other words, the reinforcement member may also be provided in the first portion 61. More specifically, when the reinforcement member of the second portion 62 of lower temperature is configured to be stronger than the reinforcement member of the first portion 61 of the higher temperature, it is possible to suppress thermal deformation of the housing 30 due to the temperature difference between the first portion 61 and the second portion 62.

The examples in the above embodiments are applied to a printer as an example of an image forming apparatus. However, the image forming apparatus according to the present invention can also be applied to a copying machine, a facsimile or the like.

In any of the above examples, in accordance with the description above, the effect of preventing the production of a jitter image or color misregistration of the color image is obtained in a housing having a multilayered structure including a hole.

What is claimed is:

1. An optical scanning apparatus, comprising:
    a housing body including a peripheral wall and a partitioning portion of a plate shape configured to divide an inner side of the peripheral wall into a first portion and a second portion, the partitioning portion including a first hole configured to cause the first portion to communicate with the second portion to form an optical path;
    a light deflector, which is mounted in the first portion, having a rotatable polygon mirror configured to perform deflection scanning of scanning light beams emitted from a plurality of light sources, and a drive unit configured to drive the rotatable polygon mirror to rotate through a drive shaft;
    a first optical system, which is mounted at least in the first portion, configured to cause the scanning light beams reflected from the rotatable polygon mirror to return towards the first hole;
    a reinforcement member, which is mounted on a surface that faces at least the second portion on the partitioning portion, configured to reinforce the housing body;
    a second optical system, which is mounted in the second portion, configured to cause the scanning light beams having reached the second portion from the first optical system in the first portion to return again towards the first portion; and
    a second hole configured to cause the first portion to communicate with the second portion to form an optical path for the scanning light beams coming from the second optical system;
    wherein the reinforcement member is mounted at a position that straddles the drive unit on the surface facing the second portion.

2. The optical scanning apparatus according to claim 1, wherein the reinforcement member is mounted between the first hole and the second hole on the surface facing the second portion.

3. The optical scanning apparatus according to claim 2, wherein the reinforcement member is formed integrally with the housing body, or is configured to be separate from the housing body while composed of material higher in stiffness than the housing body.

4. The optical scanning apparatus according to claim 3, wherein the reinforcement member is configured to be less deformable as the reinforcement member approaches the drive unit.

5. An image forming apparatus comprising the optical scanning apparatus according to claim 4,
    wherein the image forming apparatus irradiates the scanning light beams having undergone the deflection scanning performed by the rotatable polygon mirror onto a surface of an image carrier to form an electrostatic latent image thereon, such that the image forming apparatus develops the electrostatic latent image using toner to form a toner image and transfers the toner image to a recording medium.

6. An image forming apparatus comprising the optical scanning apparatus according to claim 3,
    wherein the image forming apparatus irradiates the scanning light beams having undergone the deflection scanning performed by the rotatable polygon mirror onto a surface of an image carrier to form an electrostatic latent image thereon, such that the image forming apparatus develops the electrostatic latent image using toner to form a toner image and transfers the toner image to a recording medium.

7. The optical scanning apparatus according to claim 2, wherein the reinforcement member is configured to be less deformable as the reinforcement member approaches the drive unit.

8. An image forming apparatus comprising the optical scanning apparatus according to claim 7,
wherein the image forming apparatus irradiates the scanning light beams having undergone the deflection scanning performed by the rotatable polygon mirror onto a surface of an image carrier to form an electrostatic latent image thereon, such that the image forming apparatus develops the electrostatic latent image using toner to form a toner image and transfers the toner image to a recording medium.

9. An image forming apparatus comprising the optical scanning apparatus according to claim 2,
wherein the image forming apparatus irradiates the scanning light beams having undergone the deflection scanning performed by the rotatable polygon mirror onto a surface of an image carrier to form an electrostatic latent image thereon, such that the image forming apparatus develops the electrostatic latent image using toner to form a toner image and transfers the toner image to a recording medium.

10. The optical scanning apparatus according to claim 1, wherein the reinforcement member is formed integrally with the housing body, or is configured to be separate from the housing body while composed of material higher in stiffness than the housing body.

11. An image forming apparatus comprising the optical scanning apparatus according to claim 10,
wherein the image forming apparatus irradiates the scanning light beams having undergone the deflection scanning performed by the rotatable polygon mirror onto a surface of an image carrier to form an electrostatic latent image thereon, such that the image forming apparatus develops the electrostatic latent image using toner to form a toner image and transfers the toner image to a recording medium.

12. An image forming apparatus comprising the optical scanning apparatus according to claim 1,
wherein the image forming apparatus irradiates the scanning light beams having undergone the deflection scanning performed by the rotatable polygon mirror onto a surface of an image carrier to form an electrostatic latent image thereon, such that the image forming apparatus develops the electrostatic latent image using toner to form a toner image and transfers the toner image to a recording medium.

* * * * *